Dec. 3, 1968 V. ERBERT 3,413,735

OPTICAL PATTERN RECOGNITION SYSTEM

Filed Nov. 8, 1965 2 Sheets-Sheet 1

INVENTOR
VIRGIL ERBERT

E. Mickey Hubbard
ATTORNEY 3,413,735
OPTICAL PATTERN RECOGNITION SYSTEM

Virgil Erbert, Albuquerque, N. Mex., assignor to Teaching Complements, Incorporated, Albuquerque, N. Mex., a corporation of New Mexico Filed Nov. 8, 1965, Ser. No. 506,675
19 Claims. (Cl. 35—48)

ABSTRACT OF THE DISCLOSURE

A graphic pattern recognition system which includes a character modulation means disposed at an image plane upon which the pattern to be recognized is optically projected. The character modulation means includes at least two areas each of which is spatially related to the optical pattern to be recognized. Each of the areas of the modulation means is a filter material adapted to modulate the character of the energy forming the image in a mutually distinguishable manner, such as a Polaroid material or frequency filter material. The total light of each character passed through the character modulation means is then separately summed and the summation compared to produce a recognition decision.

This invention relates generally to character recognition systems, and more particularly, but not by way of limitation, relates to a simple, compact and inexpensive optical recognition system particularly suited for use in teaching machines.

A number of different types of character recognition machines have been proposed and built which possess the capability to recgonize substantially any written or displayed character. These machines utilize a number of different principles of operation. In one type of character recognition system, the character is scanned, either by a single point photocell scanner or by a line of such scanners, and the "black" or "white" values at each scan position normalized and stored as logic levels in a shift register. The disected character thus stored in the shift register is then compared to a set of resistor matrices and the degree of match between the unknown character and each resistor matrix is measured. The unknown character is then said to be the character represented by the matrix producing the best match.

Another type of machine utilizes a complete retina of photocells each of which develops an assertion voltage or a negation voltage having values proportional to how black or how white a character is at the position opposite the particular cell. These values are again applied to a set of resistor matrices each representative of a possible character and the best match selected to indicate the unknown character.

Optical systems which use assertions and negations have also been proposed wherein the unknown character image is projected onto a pair of transparencies for each possible character by means of mirror or lens beam splitters. One of the transparencies is called an assertion mask and the other is called a negation mask. The assertion mask contains the significant areas where a particular character should be found, and the negation mask contains the significant areas where the character should not be found. A photocell sums the energy passing through each of the masks, each sum is amplified, and the output from the negation amplifier is inverted so that the voltages from both the assertion and negation photocells can be summed to indicate the degree of coalition between the unknown character and the two sets of masks.

The complexity and precision required in the character recognition equipment heretofore proposed, or the slow speed of operation, makes these machines expensive and unsuitable for many applications.

An important object of this invention is to provide a simple, economical, compact and effective optical pattern recognition system.

Another important object of the invention is to provide such a system which is particularly well suited for use in a teaching machine.

Another object is to provide such a system which is capable of recognizing hand written alphanumeric characters conforming to selected teaching constraints.

Still another object is to provide a pattern recognition system which does not require a search of stored information.

Yet another object is to provide such a system which copes with area elements of arbitrary shape, complexity and number for grading or ordering purposes.

A further object is to provide such a system having improved resolution.

Another object is to provide such a system which is very compact and inexpensive.

Still another object is to provide such a system which requires no scanning, no complex lens system and no beam splitting of the image.

A further object of the invention is to provide a pattern recogntion system wherein the pattern to be recognized can be easily and inexpensively programmed or changed.

Another object is to provide a pattern recognition system having the capability to recognize substantially any preselected pattern with greater resolving ability without perfect matching or normalization.

These and other objects are accomplished by a system comprised of a first means for presenting the pattern to be recognized at an image plane as an image formed by the spatial intensity modulation of radiant energy, character modulation means at the image plane comprised of at least two areas, each area being adapted to pass radiant energy from the first means of a character that is distinguishable from the radiant energy passed by the remaining area, each area comprising a portion of the total area of the image in which a distinguishing feature of the pattern to be recognized is likely to occur, and separate summation means for summing the total radiant energy of each character passed through the character modulation means such that a decision can be based upon the relative values of the sums.

In accordance with a more specific aspect of the invention, the first means provides an image by the spatial intensity modulation of electromagnetic energy, and the modulation means is either a polarizing material or frequency filtering material. For example, if the electromagnetic energy is light then the modulation means might be a Polaroid material or a colored material. The summation means for each area includes a filter for passing only the energy of the particular character produced by the respective area while excluding the energy of the distinguishable character produced by the modulation means of the other areas.

In accordance with a more specific aspect of the invention, a character recognition system for a teaching machine is comprised of a first sheet upon which an answer may be written in preselected areas in response to a question, means for projecting this image through a second sheet having one area which defines the significant areas in which the correct response to the question should be found and a complement area where the correct response should not be found. Each of the two areas of the second sheet is comprised of a material for modulating light such that the character of the light passing through each area will be distinguishable from light passing through the other area, and summation means for summing the total radiant energy of each distinguishable character and producing a decision based upon the relative values of the sums.

In accordance with a specific aspect of the invention, the second sheet is comprised of a Polaroid material with the axis of polarization of the material of each area disposed at an angle to the axis of polarization in the other areas so that the light passing through each area will be polarized in a different direction and will thus be distinguishable.

In accordance with another specific aspect of the invention, each modulation sheet has two areas and each summation means includes a photosensitive cell and a polarized filter positioned to pass only light of one polarity so that the resistance of each cell varies with the amount of light having the particular polarization. The photosensitive cells are connected in the legs of a bridge so that when the correct response is given, a strong current will flow in one direction through a threshold detector connected across the outputs of the bridge, and when an incorrect response is given, a very weak or opposite current will flow through the threshold detector.

In accordance with another aspect of the invention, a teaching machine is provided in which a series of written answers by a student may be checked for accuracy by means of a modulation scroll comprised of an elongated flexible Polaroid material having inserts of a flexible Polaroid material with the axis of polarization disposed at an angle to the axis of polarization of the elongated Polaroid material. The inserts at each position on the scroll define the constraints of the correct answer. A light source projects light through an answer sheet and the modulation scroll. The light passing through each insert is summed and the light passing through the area around each insert is summed and the two sum values compared to produce a decision.

In accordance with a more specific aspect of the invention, the modulation scroll and answer scroll have a number of character positions for each answer with an insert for each character position. The light passing through each insert is summed independently and compared with the light passing through the remaining area of the character position to produce a logic signal representative of the correctness of the answer at that character position. The logic signals from the several character positions are then logically multiplied, i.e., ANDed, to provide a final indication of the correctness of the answer.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

It is to be understood that the pattern recognition system of the present invention, in its broader aspects, is useful in a wide variety of pattern recognition applications. However, the system is particularly well suited for use in a teaching machine, and the broader aspects, as well as the more specific aspects, of the invention may best be understood from a description of the invention as embodied in a teaching machine.

The pattern recognition system is used in a teaching machine to determine the correctness of a written response to a question presented to a student by either oral or visual means. One important function of the teaching machine in addition to ascertaining the correctness of a response is to place certain constraints upon the quality of the written response in order to either teach the student to write, or to discipline the student to write properly. For example, the student is required to make a letter of a predetermined style in an answer block which is the full height and width of the block and is centered in an upright position within the confines of the block. Further, the characters must be made with a particular writing instrument and a firm pressure sufficient to assure high contrast and adequate line width. However, an important aspect of the invention is that the constraints can be varied as desired in order to allow for some rotational and translational displacement.

Figure 1:
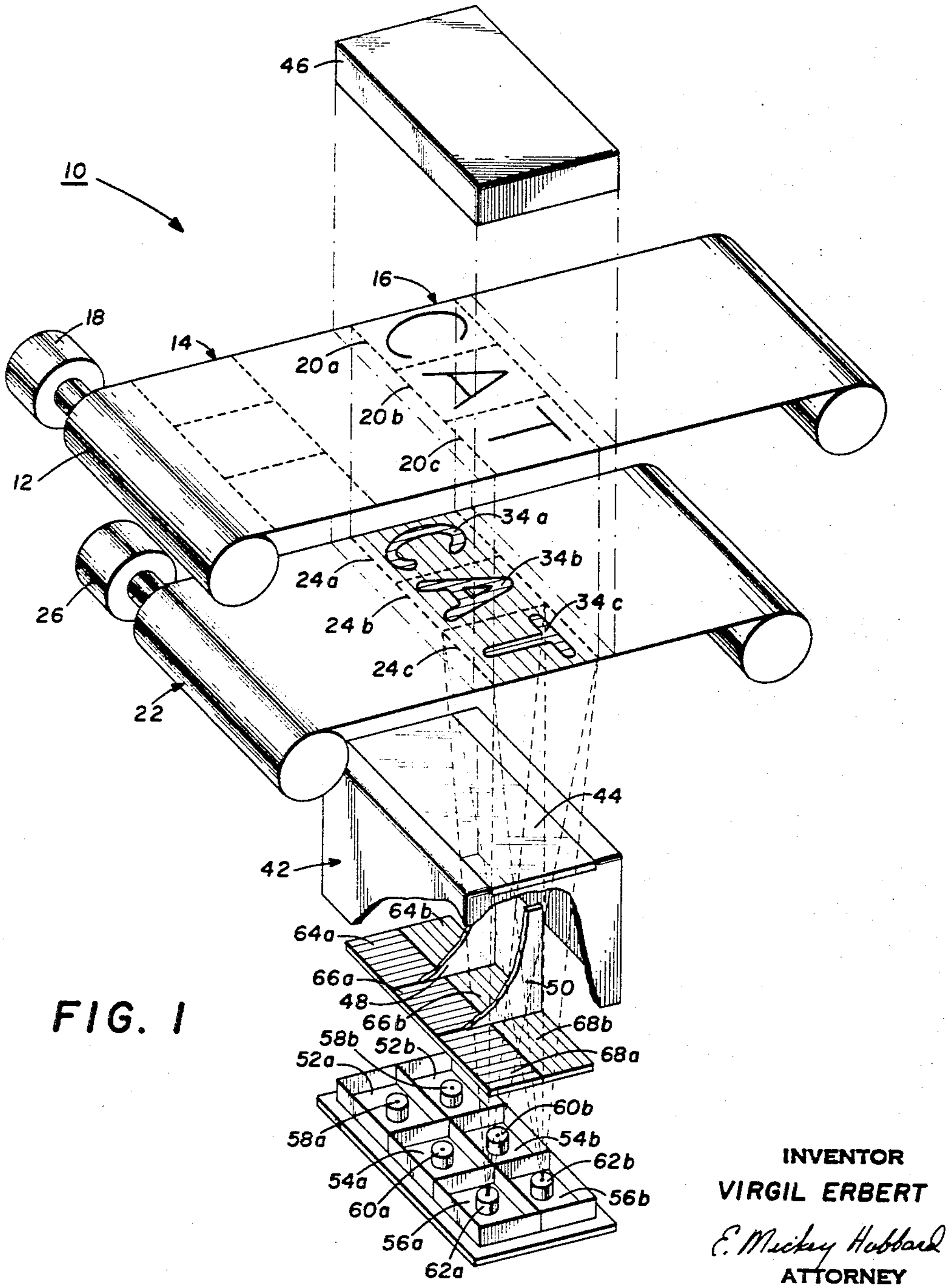
FIGURE 1 is a schematic exploded isometric view of a portion of a teaching machine which embodies the present invention.

Referring now to FIGURE 1, a teaching machine constructed in accordance with the present invention is indicated generally by the reference numeral 10. The teaching machine is comprised of an answer sheet 12 which may be an elongated strip or scroll of standard white bond paper or other suitable writing material which is translucent or transparent. The answer sheet 12 is successively indexed past a writing station, indicated generally by the dotted outline 14 and a comparison station indicated generally by the reference numeral 16 by means of a suitable indexing mechanism represented schematically at 18. As illustrated, the sheet 12 is provided with three rectangular character areas or blocks **20*a*, 20*b* and 20*c* arrayed transversely of the sheet 12. Of course it will be appreciated that substantially any number of character blocks may be provided as required and may be arranged as desired on the answer sheet, provided the necessary modulating and sensing means is provided as will hereafter become more evident. The answer sheet 12, upon which the student has written the correct answer "CAT," for example, is superimposed over a modulation sheet 22 which may also be elongated and in the form of a scroll, and has a number of character blocks 24*a*, 24*b* and 24*c* corresponding in size and position to the character blocks 20*a*–20*c* on the answer sheet 12. The character blocks 24*a*–24*c* may be positioned at the comparison station 16 by a suitable indexing means indicated schematically at 26. The modulation sheet 22 includes a set of character blocks (not illustrated) for each question to be asked the student, with the sets arranged in the proper sequence for comparison with the answers written by the student on the answer sheet 12** as will presently be described.

Figure 2:
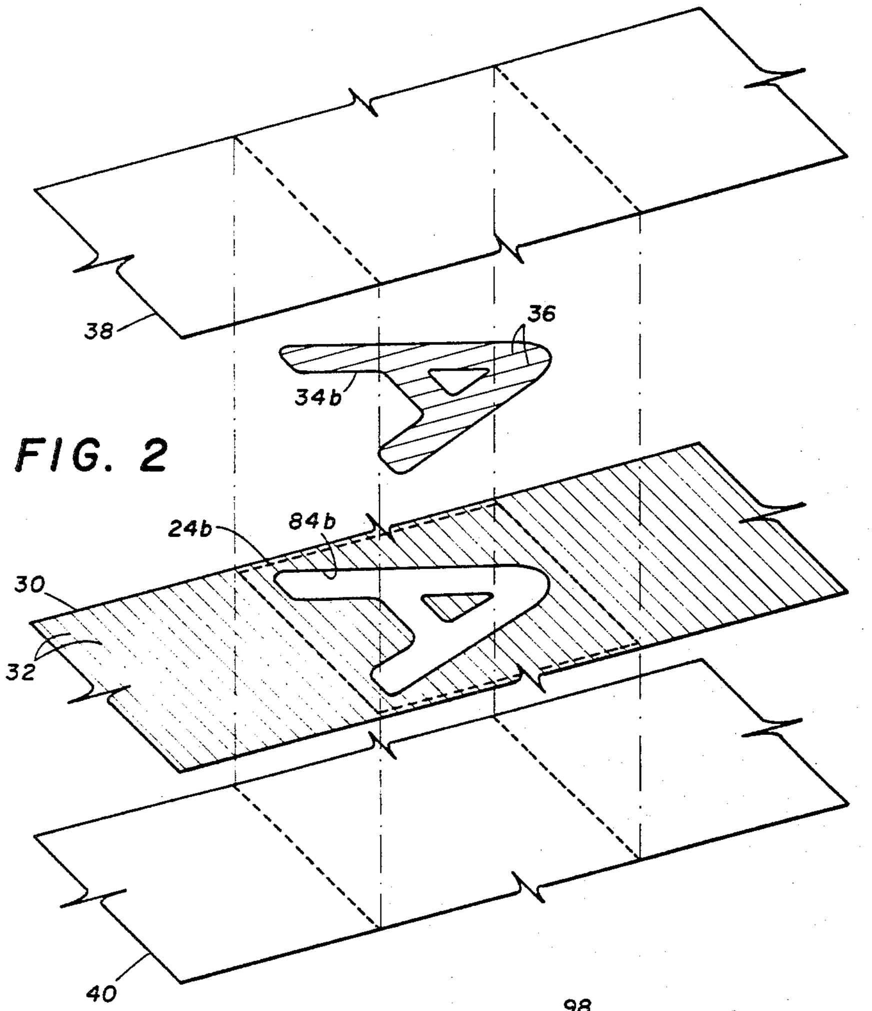
FIGURE 2 is an exploded isometric view illustrating the manner in which the modulation scroll of the teaching machine of FIGURE 1 may be fabricated.

The modulation sheet 22 may be formed of any material for modulating light in a distinguishable manner, and is preferably fabricated as illustrated in the exploded view of FIGURE 2. Thus the modulation sheet 22 is preferably comprised of a core sheet 30 formed from a flexible Polaroid material which may conveniently extend for the entire length and width of the sheet 22. As illustrated, the axis of polarization of the core sheet 30 is disposed transversely of the length of the sheet 22 as represented by the lines 32. Within each character block **24*a*–24*c*, a portion of the core sheet 30 is cut away and replaced by polaroid inserts 34*a*–34*c*, respectively. The axis of polarization, as represented by the lines 36, of each of the inserts 34*a*–34*c* is at 90° to the axis of polarization of the core sheet 30. The Polaroid core sheet 30 and inserts 34 are then sandwiched between a pair of transparent plastic sheets 38 and 40**.

Each of the inserts **34*a*–34*c* defines generally the constraints upon the correct answer to a particular question. Thus each insert 34*a* defines the area in which the pattern, i.e., character, to be recognized should be found and the remnant portion of the corresponding character block 24a–24c** defines the area in which the character should not be found.

The modulation sheet 22 is positioned over the face of a light-tight box, indicated generally by the reference numeral 42, which has a transparent window 44 conforming generally to the three character blocks 24a–24c. A suitable light source 46, which may be the light source of a classroom, a conventional incandescent source, side lighted plastic sheet, etc., is positioned to direct light through the answer sheet 12, modulation sheet 22 and window 44 into the interior of the box 42. The interior of the box 42 is divided into a separate compartment for each character block by partitions 48 and 50 so that the light passing through each of the individual character blocks 24a–24c will be isolated from the light passing through the other character blocks. The lower portion of each compartment is further divided into a pair of light compartments, 52a and 52b, 54a and 54b, and 56a and 56b, by upright partitions as indicated in FIGURE 1. Photoresistors or other photosensitive devices, 58a and 58b, 60a and 60b, and 62a and 62b, are positioned in compartments 52a and 52b, 54a and 54b, and 56a and 56b, respectively. The compartments 52a, 54a and 56a are covered by Polaroid filters 64a, 66a and 68a, respectively. The axes of polarization of the filters 64a, 66a and 68a are disposed parallel to the polarization axes of the inserts 34a–34c. Similarly, the compartments 52b, 54b and 56b are covered by Polaroid filters 64b, 66b and 68b in which the polarization axis is disposed parallel to the polarization axis of the core sheet 30. Thus light from the source 46 which passes through character area 24a and insert 34a will be polarized such that it will pass only through filter 64a and not 64b. As a result, the output of the photoresistor 58a will be proportional and representative of the total light passing through the area of the insert 34a. Similarly, photoresistors 60a and 62a sense the light passing through areas of inserts 34b and 34c. On the other hand, photosensitive cells 58b, 60b and 62b sense only the light passing through the remnant areas of character blocks 24a, 24b and 24c, respectively.

Figure 3:
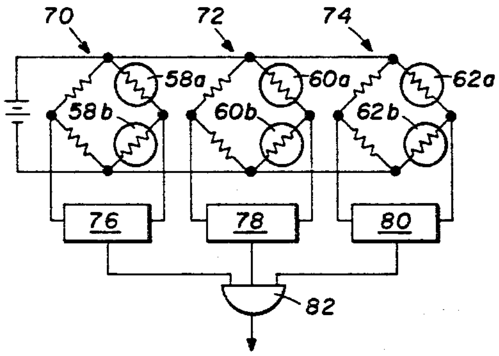
FIGURE 3 is a schematic circuit diagram of the summation and logic network of the machine of FIGURE 1.

Referring now to FIGURE 3, the photoresistors 58a and 58b are connected in separate legs of a resistor bridge 70, photoresistors 60a and 60b are connected in separate legs of a resistor bridge 72 and photoresistors 62a and 62b are connected in separate legs of a resistor bridge 74. The outputs of bridges 70, 72 and 74 are connected to threshold detectors 76, 78 and 80, respectively. Each of the threshold detectors is set to produce one logic level when the current through the respective threshold detector is in a direction and exceeds a predetermined limit so as to indicate that the correct character is formed in the corresponding character block, and to produce the other logic level when the current is less than the preselected level or in the opposite direction indicating that the character in the corresponding block is incorrect. The outputs of the three threshold detectors 76, 78 and 80 are connected to inputs of an AND gate 82, and the output of gate 82 has a pair of logic levels, one of which indicates that a correct answer has been made and the other of which indicates that an incorrect answer has been made as will now be described.

In the operation of the teaching machine 10, a question is presented to the student either orally or in writing, and the modulation sheet 22 is indexed such that the correct answer to the question is positioned at the station 16. The student responds by writing his answer on the portion of the answer sheet exposed at station 14. The answer sheet 12 is then irretrievably indexed to the station 16. Light from the source 46 then passes through the answer sheet 12, but is blocked by the opaque lines of the characters made by the student. The light then passes through the modulation sheet 22 and the light which passes through the inserts 34a, 34b and 34c is polarized along one axis and the light passing through the remaining areas of each of the character blocks 24a, 24b and 24c is polarized along an axis at 90° to the other light.

As a result of the polarizing filter 64a, photoresistor 58a senses only the light passing through the insert 34a, while the photoresistor 58b, because of the polarizing filter 64b, senses only the light passing through the remaining area of character block 24a. The values of the resistors of the bridge 70 are preferably selected such that no appreciable current flows through the threshold detector 76 in the absence of a character being written in the character block 20a on the answer sheet 12. Then if the correct character is written in the character block 20a, the light to photoresistor 58b will remain unchanged and therefore its resistance will remain unchanged, but the light to photoresistor 58a will be decreased significantly as a result of the character overshadowing a portion of the area of the insert 34a. As a result, the resistance of photoresistor 58a will either increase, or decrease, depending upon the type of sensor used, which will result in a strong imbalance in the bridge 70 and produce a current through the threshold detector 76. For example, assume that the resistance of photoresistor 58a increases with a decrease in total light falling on the photoresistor, then current will flow from left to right through the threshold detector 76. If the character written in block 20a is also of the correct size and darkness, then the threshold level of the detector 76 will be exceeded and the detector will produce a logic "1" output to the gate 82.

On the other hand, if the character written in block 20a is incorrect, a portion of the character will overlie the remnant area of the character block 24a so that the light to photoresistor 58a will not be diminished as much as when the correct character was written, and the light to photoresistor 58b will also be diminished. As a result, the resistances of the photoresistors 58a and 58b, although both increasing, tend to remain at more nearly the same value, or the resistance of photoresistor 58b may even be greater than the resistance of photoresistor 58a, so that the current through the threshold detector 76 will either be at a very low level or in the opposite direction, i.e., from right to left, so that the output of the threshold detector will remain at a logic "0" level and the gate 82 disabled. If the correct characters have been written in both of the other character blocks 20b and 20c, the bridges 72 and 74 will also be imbalanced in the same direction to a sufficient degree to cause the outputs from the threshold detectors 78 and 90 to also go to a logic "1" level, in which case the AND gate 82 will produce a logic "1" output indicating that a complete correct answer has been made by the student. If any one of the characters is incorrect, the gate 82 is disabled from producing a logic level indicative of a correct answer.

For most teaching applications, it will be desirable to make the areas 34a, 34b and 34c conform rather strictly to the correct character within the selected constraints. Then by setting the threshold detectors 76, 78 and 80 at high levels so as to require a maximum amount of the constraint areas to be opaqued out by the written character, almost any degree of discipline can be placed upon the student with regard to the size, shape, position, etc, of the characters necessary to obtain a correct answer. This is particularly useful when teaching the student to write. Within the broader aspects of the invention, however a single specially designed modulation pattern, such as the character block 24a, may be used to recognize a number of different characters or patterns by using a threshold detector having a number of different, properly selected threshold levels. For example, experiments show that a modulation pattern area containing the character A, such as the character area 24b, is capable of clearly distinguishing the first five letters of the alphabet by different threshold levels. By a special purpose optimumly selected configuration of the modulation pattern, it is possible to distinguish a large number of different patterns as a result of the graded or ordered levels of current from the threshold detectors.

Figure 4:
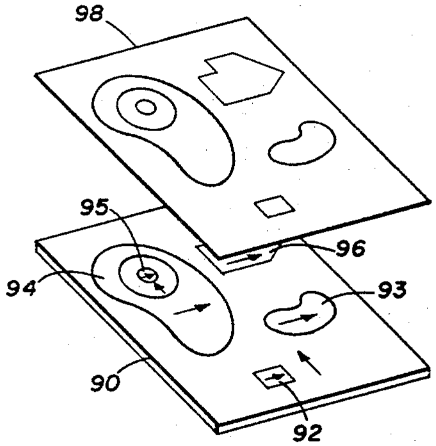
FIGURE 4 is a schematic drawing illustrating the manner in which the invention, within its broader aspects, may be utilized to recognize substantially any preselected pattern.

The pattern recognition system of the present invention may also be used to identify preselected patterns other than alphanumeric characters such as will customarily be used in a teaching machine. For example, the system may be used to identify an aerial view of the earth for navigational or other purposes. This is accomplished by means of a modulation pattern such as illustrated in FIGURE 4 wherein a modulation sheet 90 is a composite of two or more different filters for electromagnetic or other modulatable radiant energy. By way of example, the modulation sheet 90 may be a composite of Polaroid material patterned to correspond to characteristic features of the pattern to be recognized. For example, assume that the areas 92–96 correspond to distinguishing dark features in an aerial photograph, while the remaining area corresponds to lighter areas. The axis of polarization of the Polaroid material in all of the areas 92–96 would then be aligned in the same direction, while the axis of polarization of the remaining portion of the pattern would be oriented at 90°. Then the light imagine 98 to be recognized, such as that portion of the earth itself, or the objects thereon, is projected through the modulation sheet 90 by any suitable means so that the light is modulated by polarization in a direction corresponding to the area of the sheet 90 through which the light passed. Each of the two distinguishable quanta of light is then totaled as heretofore described and the totals compared to produce a decision.

Although the present invention may be very easily implemented using light as the radiant energy and Polaroid materials as both the modulation and filter means, it is to be understood that the invention, within its broader aspects, may also be carried out using substantially any other modulatable radiant energy and filter means suited to modulate the energy in a distinguishable manner. For example, frequency filter means may be used on electromagnetic wave energy in different frequency ranges. In the visible light spectrum, such frequency filters would take the form of color filters for example.

In accordance with an important aspect of the invention, the modulation sheet may comprise more than two areas for modulating the radiant energy in a distinguishable manner. For example, by using two different color sensitive Polaroid materials, light may be modulated in four distinguishable forms, so that four separate characteristics of the pattern may be sensed separately. For example, Polaroid material of one color may be placed with the axis of polarization at 90° to define two areas, and Polaroid material of another color placed with the axis of polarization at 90° to define two more areas. These areas may be intermingled in any desired manner to define the pattern to be recognized or to form an optimum modulation pattern capable of recognizing a number of different patterns. Four separate sensors, each provided with a filter for passing only the light from one of the areas, may then be used to sense the level of light passing through each area. Any desired combination of threshold detectors and logic circuits may then be employed to distinguish one or more patterns. It will be appreciated that this basic recognition tool provides an almost infinite capability to recognize different patterns from a single composite modulation sheet if desired because the modulation sheet may be divided into a large number of distinguishable modulation areas and the level of light passing through each area used to determine one or more threshold levels which may in turn be combined with threshold levels from the other areas by any desired logic.

From the above description of preferred embodiments of the invention, it will be appreciated that a very simple and economical pattern recognition system has been described. The system is particularly well suited for use in a teaching machine, but has general application. A system for use in a teaching machine to determine the correctness of a written answer has also been described which may be used for teaching writing or any other subject requiring a written response. The written response may be made on conventional paper and is irretrievably passed from the control of the student prior to grading. The written response provides a permanent record of the answers to a series of questions.

Although preferred embodiments of the invention have been described in detail, it is to be understood that various changes, substitutions and alterations can be made therein without departing from the spirit and scope of the invention as defined by the appended claims.

What is claimed is:

1. In a graphic pattern recognition system, the combination of:

first means for presenting the pattern to be recognized at an image plane as an image formed by the spatial intensity modulation of radiant energy, character modulation means at the image plane having at least two subareas, at least one subarea being adapted to pass radiant energy from the first means of a character that can be separately sensed in the presence of the radiant energy passed by at least one of the other subareas, at least one subarea comprising a portion of the total area of the image in which a distinguishing feature of the pattern to be recognized is likely to occur, and means for separately sensing and summing the total radiant energy of at least two separately sensible characters passed through the character modulation means whereby a decision can be based on the relative values of the separate sums.

2. The combination defined in claim 1 wherein:

the radiant energy is light, and the character modulation means is a light transmitting sheet and at least one of the subareas is comprised of a light polarizing material.

3. The combination defined in claim 2 wherein:

the summation means includes a polarized filter means for passing only the light passed by one subarea of the character modulation means, and means for summing the light energy passing through the polarized filter means.

4. The combination defined in claim 3 wherein:

at least two of the subareas of the character modulating means are formed from light polarizing material and the polarizing axes of the material in the respective subareas are oriented at an angle sufficient to distinguish the light passing through each.

5. The combination defined in claim 1 wherein:

there are two subareas and one subarea includes substantially all of the area in which features of a written character are likely to occur, and the other subarea includes the remaining area.

6. In a pattern recognition system for a teaching machine, the combination of:

a light transmitting pupil answer sheet adapted to receive written answers in at least one pupil answer block in the form of lines more opaque than the pupil answer sheet, a correct answer sheet having a correct answer block disposed adjacent the pupil answer block of the pupil answer sheet and corresponding generally to the pupil answer block, the correct answer block being comprised of a first area defining the constraints of a correct answer, and a second area comprised of the remaining area of the correct answer block, the material in the first and second areas being adapted to transmit light of mutually distinguishable character, a light source disposed to project light through the pupil answer block and the correct answer block such that the light will be spatially modulated in intensity by the pupil answer sheet and modulated in character by the respective areas of the correct answer sheet, and sensing means for separately sensing and summing the total light of each character passing through the correct answer block whereby the sums may be compared to produce a decision as to the correctness of the answer.

7. The combination defined in claim 6 wherein:

the correct answer sheet is comprised of a light polarizing material and the axis of polarization of the polarizing material in the first area is disposed at substantially ninety degrees to the axis of polarization of the light polarizing material in the second area.

8. The combination defined in claim 7 wherein:

the sensing means is comprised of first and second polarized filter means, the axis of polarization of each filter means being oriented to pass only the light from one of the first and second areas, and first and second photosensitive means for summing the light passing through the first and second filter means, respectively.

9. The combination defined in claim 8 further characterized by:

a bridge circuit comprised of a pair of resistors connected in series across a voltage supply, the first and second photosensitive means connected in series across the voltage supply, and a threshold detector connected between the junction between the first and second resistors and the first and second photosensitive means for producing a logic output indicative of a correct answer when the current through the threshold detector is of a predetermined polarity and magnitude and not otherwise.

10. The combination defined in claim 9 wherein:

there are a plurality of pupil answer blocks for each written answer and a corresponding number of correct answer blocks, first and second filter means, bridge circuits and threshold detectors, and further characterized by logic circuit means connected to the outputs of all of the threshold detectors for producing a logic level indicative of a correct answer only when all of the threshold detectors produce a logic level indicative of a correct answer.

11. The combination defined in claim 6 wherein the correct answer sheet is an elongated sheet having a plurality of correct answer blocks spaced longitudinally of the sheet each providing the correct answer to a separate question.

12. The combination defined in claim 11 wherein the pupil answer sheet is also an elongated sheet having a pupil answer block for each correct answer block.

13. An insert for a teaching machine having a station including a light source for projecting a light image of an answer written by a pupil in a pupil answer block onto an image plane and means for separately summing light of two mutually distinguishable characters passing through the image plane and producing a decision based upon the values of the two sums comprising:

a modulation sheet having a correct answer block positionable at the image plane such that the light image of the answer will be projected through the correct answer block, the correct answer block having a first area defining the constraints of a correct answer and a second area comprised of the remaining area of the correct answer block, the first and second areas being formed of sheet material adapted to pass only light of mutually distinguishable character such that the light of each character can be separately summed by means exposed to light from both the first and second areas.

14. The insert defined in claim 13 wherein the sheet material forming the first and second areas is a light polarizing material with the axes of polarization disposed at an angle.

15. The insert defined in claim 13 further characterized by:

a light transmitting pupil answer sheet having a pupil answer block overlying the correct answer block on the correct answer sheet and adapted to receive a pupil's written answer in the pupil answer block in the form of lines more opaque than the pupil answer sheet.

16. The insert defined in claim 15 wherein the correct answer sheet and pupil answer sheet are superimposed, elongated sheets having a series of superimposed pupil answer blocks and correct answer blocks spaced longitudinally thereof and adapted to be sequentially positioned at said station.

17. The method for recognizing an image formed by the spatial intensity modulation of radiant energy which comprises:

modulating the character of the radiant energy in at least one subarea of the image such that the energy in that subarea can be separately sensed in the presence of the energy in at least one other subarea of the image, at least one of the subareas in which the energy is separately sensible comprising a portion of the total area of the image in which a distinguishable feature of the image to be recognized is likely to occur, and separately sensing and summing the total radiant energy of at least two separately sensible characters contained in the image and comparing the sums to provide an indication of the degree of match.

18. The method of claim 17 wherein the frequency of the radiant energy is modulated.

19. The method of claim 17 wherein the polarity of the radiant energy is modulated.

References Cited

UNITED STATES PATENTS

| | | | |
|---|---|---|---|
| 3,085,226 | 4/1963 | Brown | 340—146.3 |
| 3,227,034 | 1/1966 | Shelton. | |

EUGENE R. CAPOZIO, *Primary Examiner.*

W. W. NIELSEN, *Assistant Examiner.*